(12) United States Patent
Nishioka et al.

(10) Patent No.: US 6,653,769 B1
(45) Date of Patent: Nov. 25, 2003

(54) SPACERS USED FOR PICTURE DISPLAY DEVICES AND A METHOD OF PRODUCING THE SAME

(75) Inventors: Yasuhiko Nishioka, Kokubu (JP); Yasuhito Muramoto, Kokubu (JP); Masashi Kato, Kokubu (JP); Kiyohiro Sakasegawa, Kokubu (JP); Kazuo Watada, Kokubu (JP); Akihiko Takahashi, Youkaichi (JP); Kouji Hamada, Youkaichi (JP)

(73) Assignee: Kyocera Corporation, Kyoto (JP)

( * ) Notice: Subject to any disclaimer, the term of this patent is extended or adjusted under 35 U.S.C. 154(b) by 236 days.

(21) Appl. No.: 09/595,979

(22) Filed: Jun. 16, 2000

(30) Foreign Application Priority Data

| | | |
|---|---|---|
| Jun. 17, 1999 | (JP) | 11-171602 |
| Aug. 31, 1999 | (JP) | 11-245354 |
| Sep. 28, 1999 | (JP) | 11-275359 |
| Oct. 29, 1999 | (JP) | 11-309643 |

(51) Int. Cl.$^7$ ................................................ H01J 19/42
(52) U.S. Cl. ...................... 313/292; 313/238; 313/495
(58) Field of Search .................................. 313/292, 495, 313/238; 501/32, 17

(56) References Cited

U.S. PATENT DOCUMENTS

| | | | | |
|---|---|---|---|---|
| 4,070,517 A | * | 1/1978 | Kazmierowicz | 428/209 |
| 4,255,291 A | * | 3/1981 | Needes et al. | 252/578 |
| 4,269,617 A | * | 5/1981 | Shibuya et al. | 65/43 |
| 5,442,255 A | * | 8/1995 | Ise et al. | 313/495 |
| 6,157,123 A | * | 12/2000 | Schmid et al. | 313/422 |
| 6,200,181 B1 | * | 3/2001 | Narayanan et al. | 445/24 |
| 6,366,014 B1 | * | 4/2002 | Kuroda et al. | 313/495 |
| 6,387,600 B1 | * | 5/2002 | Hanson | 430/316 |

* cited by examiner

Primary Examiner—Edward J. Glick
Assistant Examiner—Jurie Yun
(74) Attorney, Agent, or Firm—Hogan & Hartson (57) ABSTRACT

Spacers used in a picture display device are formed of a sintered product having a structure in which at least one kind of metal selected from the group consisting of Si, Zn, Al, Sn, Cu and Mg is dispersed in a glass. In the picture display device using spacers, therefore, the spacers are effectively prevented from being electrically charged and, besides, trouble such as distortion in the displayed picture caused by the electric charge in the spacers is effectively prevented, too. In producing the spacers by firing, further, the volume expands due to the oxidation of the metal component, whereby shrinkage due to firing is effectively relaxed, making it possible to produce the spacers maintaining a high dimensional precision. Besides, the spacers are effectively prevented from being deformed by the shrinkage caused by firing.

15 Claims, 8 Drawing Sheets

SAMPLE No.1

FIG.7

SAMPLE No.6

FIG.8

SPACERS USED FOR PICTURE DISPLAY DEVICES AND A METHOD OF PRODUCING THE SAME

BACKGROUND OF THE INVENTION

1. Field of the Invention

The present invention relates to spacers incorporated in picture display devices such as a plasma display, a field emission display and the like, and to a method of producing the same.

2. Description of the Prior Art

There have, in recent years, been developed picture display devices such as a plasma display panel (PDP), a plasma address liquid crystal (PALC) panel and a field emission display (FED). These picture display devices are equipped with a face plate for displaying picture and a back plate arranged maintaining a gap with respect to the back surface of the face plate and in parallel therewith and, further, with plural spacers maintaining a suitable gap to maintain space for electric discharge between the face plate and the back plate. That is, in these picture display devices, the interiors of the devices must be maintained vacuum to form space for electric charge and, hence, the face plate and the back plate must be prevented from being deflected by the atmospheric pressure. It therefore becomes necessary to provide plural spaces of a suitable height (length) between the face plate and the back plate.

In the above-mentioned field emission display, for example, the back plate is provided with plural electron emissive elements that generate electron rays which are then accelerated to have the phosphor formed on the face plate emit light to display the picture. In this field emission display, further, the gap of not smaller than 500 $\mu$m must be maintained between the face plate and the back plate in order to prevent abnormal electric discharge between the electron emissive elements and the phosphor as well as to obtain a desired brightness by controlling the current density of the electron rays and the acceleration condition. Accordingly, the spacers must have a height of not smaller than 500 $\mu$m.

As a method of producing the above-mentioned spacers, there has been known a method of forming spacers integrally with the back plate or the face plate. In the plasma display panel, for example, a paste is prepared by adding an organic resin (acrylic binder or dispersant) and an organic solvent to a mixture of a glass and a ceramic filler (softening point-improving agent or pigment) such as $ZrO_2$, $SiO_2$, etc., a molded article of spacers is formed on the surface of the glass plate which may be an alkali borosilicate glass by using the paste, and the molded article is fired at a temperature (e.g., about 550° C.) at which the glass plate does not shrink thereby to form spacers on the surface of the glass plate. The molded article of spacers is obtained by printing the paste onto the surface of the glass plate or by using a mold. This method makes it possible to form spaces having a thickness of usually, about 40 $\mu$m and a height of about 150 $\mu$m together with the glass plate. The glass plate is used as a face plate or as a back plate.

According to the method of forming spacers integrally with the glass plate which serves as the face plate or the back plate by firing the molded article of spacers formed on the glass plate by using the paste containing glass and ceramic filler as described above, however, it is not allowed to precisely form the spacers due to shrinkage by firing and, besides, the spacers are deformed or peeled off the glass plate.

That is, in firing the molded article of spacers, the glass plate supporting the molded article does not almost shrink but the molded article (spacers) only shrinks, developing a difference of shrinkage between the spacers and the glass plate and arousing the above-mentioned problems.

When the spacers of a small height are formed, the shrinkage in the spacers caused by firing decreases due to the locking force of the glass plate, and the above-mentioned problem does not almost occur. Therefore, the above-mentioned method of forming the spacers is adapted to the plasma display panel which needs have spacers of a small height. As the height of the spacers increases, however, the shrinking force of the spacers becomes greater than the locking force of the glass plate; i.e., it becomes no longer possible to decrease the shrinkage of the spacers caused by firing, and the above-mentioned problem becomes conspicuous. Accordingly, the above-mentioned method of forming the spacers could not be applied to the field emission display that requires spacers having a height of not smaller than 500 $\mu$m. Even if it could be applied, the thickness of the spacers must be very increased. After all, the method of forming such spacers is not suited for the field emission display.

In the field emission display, therefore, a glass or ceramics after firing is cut into the shape of spacers and is stuck to the surface of the glass plate that serves as the face plate or the back plate to form spacers. This method, however, forms the spacers having a low dimensional precision or a low positional precision requiring laborious work and, besides, is not suited for decreasing the thickness of the spacers or the gap among the spacers.

In the field emission display, further, electrons emitted from the electron emissive elements impinge upon the wall surfaces of the spacers present close to the trajectory of electrons causing the wall surfaces of the spacers to be electrically charged. That is, the electron rays generated from the electron emissive elements are bent by the electric charge on the wall surfaces of the spacers, whereby the electron rays fail to arrive at predetermined positions on the face plate maintaining precision, causing the picture displayed on the front plate to be distorted, developing abnormal electric discharge between the electron emissive elements and the spacers, and decreasing the density of electron rays arriving at the phosphor, making it difficult to obtain a desired brightness.

SUMMARY OF THE INVENTION

It is therefore an object of the present invention to provide spacers which are effectively prevented from being deformed or peeled due to the shrinkage caused by firing and are further effectively prevented from being electrically charged, and a method of producing the same.

Another object of the present invention is to provide spacers that are formed integrally with the face plate or the back plate, and are particularly effectively used for the field emission display, and a method of producing the same.

A further object of the present invention is to provide a method of producing spacers, effectively preventing the shrinkage caused by firing even in forming spacers having a height (length) of not smaller than 500 $\mu$m, and effectively preventing deformation or peeling caused by shrinkage due to firing.

A still further object of the present invention is to provide a method of producing spacers, which makes it possible to decrease the thickness and the gap.

According to the present invention, there are provided spacers disposed between a face plate which displays a picture and a back plate that faces a back surface of the face plate to maintain space for electric discharge therebetween, wherein said spacers are formed of a sintered product having a structure in which at least one kind of metal selected from the group consisting of Si, Zn, Al, Sn, Cu and Mg is dispersed in a glass.

According to the present invention, further, there is provided a method of producing a ceramic by preparing a molded article by using a mixture of a glass and at least one kind of metal selected from the group consisting of Si, Zn, Al, Sn, Cu and Mg, and firing the molded article in an oxygen-containing atmosphere to oxidize part of said metal.

According to the present invention, there is further provided a picture display device comprising a face plate for displaying a picture having a phosphor layer formed on a back surface thereof, a back plate facing the back surface of the face plate and having electron emissive elements on the surface thereof on the side of the face plate, and spacers provided between the face plate and the back plate to maintain space for electric discharge therebetween, wherein said spacers are formed of a sintered product having a structure in which at least one kind of metal selected from the group consisting of Si, Zn, Al, Sn, Cu and Mg is dispersed in a glass.

The spacers of the present invention have a distinguished feature in that they are formed of a sintered product having a structure in which a predetermined metal (Si, Zn, Al, Sn, Cu or Mg) is dispersed in the glass.

That is, electrically conducting property is imparted to the spacers due to the metal dispersed in the glass. Therefore, the spacers arranged near the electron emissive elements are effectively prevented from being electrically charged, effectively avoiding such problems as distortion of the picture or drop in the brightness specific to the field emission display caused by the electric charge in the spacer.

A ceramic which constitute such spacers is obtained by firing a molded article (having a shape of the spacer) of a mixture of the glass and the metal, in an oxygen-containing atmosphere. Due to the firing, the metal is partly oxidized to undergo the volume expansion. Shrinkage of the molded article due to firing is relaxed by the volume expansion of part of the metal. Therefore, the spacers of the invention having the metal dispersed in the glass can be formed integrally with the insulating plate such as face plate or back plate of the picture display device. Therefore, the spacers shrink little through firing even when they have a height of not smaller than 500 μm, and are prevented from being deformed or from being peeled off the glass plate. Besides, the thickness of the spacers needs not be unnecessarily increased offering advantage from the standpoint of decreasing the thickness of the spacers and decreasing the gap among plural spacers.

Thus, the spacers of the present invention are particularly effectively utilized for the field emission display (FED) that requires spacers having a height of not smaller than 500 μm.

DETAILED DESCRIPTION OF THE INVENTION

Figure 1:
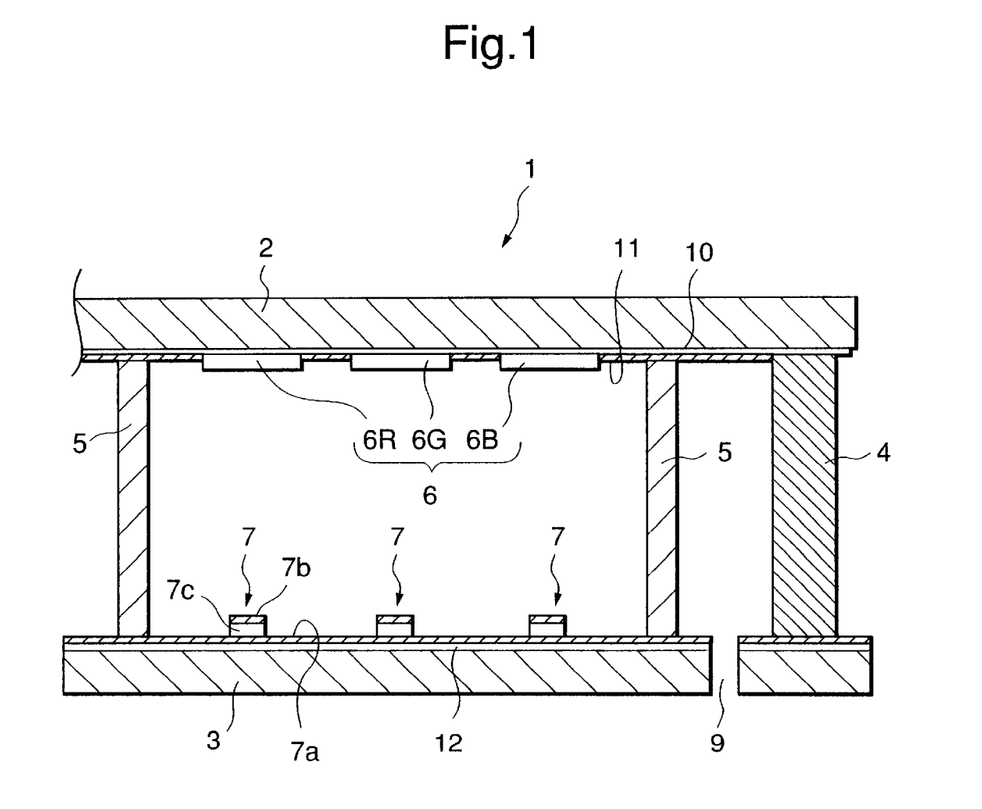
FIG. 1 is a sectional view schematically illustrating a picture display device (FED) equipped with spacers of the present invention.

The structure of the picture display device (FED) equipped with the spacers of the present invention will now be described. Referring to FIG. 1, the display device which is generally designated at 1 includes a face plate 2 and a back plate 3 that faces the back surface of the face plate 2 and is disposed in parallel therewith. A frame 4 is secured with an adhesive such as frit glass to the outer peripheral portions of the face plate 2 and the back plate 3, and space between the face plate 2 and the back plate 3 is sealed with the frame 4. In space sealed with the frame 4, there are arranged spacers 5 of the present invention in a plural number maintaining a suitable gap, and the gap between the face plate 2 and the back plate 3 is maintained constant.

A picture is displayed on the face plate 2. For this purpose, a phosphor layer 6 is formed on the back surface (facing the back plate 3) of the face plate 2. That is, as the phosphor layer 6 emits light, a predetermined picture is displayed on the face plate 2. The phosphor layer 6 comprises at least three kinds of phosphors that emit light of any color of red (R), green (G) and blue (B). Plural sets of phosphor layers 6 are regularly arranged in the form of a matrix, each set of phosphor layer 6 including a phosphor layer 6R of a red phosphor, a phosphor layer 6G of a green phosphor and a phosphor layer 6B of a blue phosphor.

Plural electron emissive elements 7 are provided on the inner surface of the back plate 3 (on the surface facing the face plate 2) so as to be opposed to the phosphor layer 6. That is, the electron beams emitted from the electron emissive elements 7 impinge upon the phosphor layer 6 so as to emit light of each of the colors. Due to the thus emitted light, a picture is displayed on the face plate 2. The structure of the electron emissive elements 7 has been known, and various structures can be employed. In the example of FIG. 1, plural linear anode layers 7a and plural linear cathode layers 7b are provided in parallel maintaining a suitable gap on the inner surface of the back plate 3, respectively, and the positive electrode layers 7a and the negative electrode layers 7b intersect each other. An insulating layer 7c is formed between the anode layer 7a and the cathode layer 7b at the intersecting portion thereof. That is, the electron emissive element 7 is constituted by the anode layer 7a, cathode layer 7b and insulating layer 7c at the intersecting portion thereof. This structure of the electron emissive element 7 is called MIM-type structure. The structure of the electron emissive element 7 is not limited to the MIM-type structure only but may be the so-called surface conductor-type structure or the field emission-type structure, that have been known.

In the above picture display device (FED) 1, space between the face plate 2 and the back plate 3 is sealed with the frame 4 to emit electron beams from the electron emissive elements 7 onto the phosphor layer 6. Besides, the space (for electric discharge) is maintained in a vacuum state of, for example, about $10^{-4}$ Pa being evacuated through a gas exhaust port 9 formed in an end of the back plate 2.

Spacers 5 are provided in the space sealed with the frame 4 to maintain the gap between the ace plate 2 and the back plate 3 constant, to prevent the ace plate 2 and the back plate 3 from being deformed by he atmospheric pressure, and to maintain proper space for electric discharge.

In the picture display device 1, the face plate 2 is formed of a transparent plate which comprises a glass such s quartz glass, soda lime glass, low-soda glass, lead alkali silicate glass, borosilicate glass, or a sapphire, quartz, single crystalline zirconia or diamond.

The back plate 3 may be formed of a glass plate such as of quartz glass, soda lime glass, low-soda glass, lead alkali silicate glass or borosilicate glass, or a ceramic late such as of alumina or silica, or a silicon plate. In general, however, it is desired that the back plate 3 is formed of a low-soda glass containing sodium and lead in small amounts.

The anode layer 7a and the cathode layer 7b constituting the electron emissive element 7 can be formed by using at least one kind of metal selected from the group consisting of silver, aluminum, nickel, platinum, gold and palladium, or by using alloys containing these metals, amorphous silicon, polysilicon or graphite. Further, the insulating layer 7c may chiefly comprise a compound such as an oxide or a nitride of at least one kind of metal selected from the group consisting of Si, Ti, Ga, W, Al and Pd.

Further, the frame 4 is usually formed of a glass obtained by sintering a frit glass.

Referring to FIG. 1, a transparent ITO (indium-tin oxide) film 10 can be formed between the phosphor layer 6 and the face plate 2 to accelerate the electron beams emitted from the electron emissive elements 7 to the phosphor layer 6. Instead of the ITO film 10, further, a metal back (not shown) formed of a metal layer having a thickness of from 100 to 300 nm may be disposed on the surface of the phosphor layer 6 (front surface on the side of the back plate 3). Upon providing such a metal back, the electron beams are accelerated, and light scattered from the phosphor layer 6 is reflected to heighten the brightness of emitted light. The metal back is usually formed of a metal foil such as of aluminum, silver, nickel or platinum.

As shown in FIG. 1, further, a so-called black matrix 11 of black or a dark color can be provided on the portions on the back surface of the face plate 2 on where the phosphor layer 6 is not formed to obtain a sharp picture by preventing blurring of color of the picture displayed on the face plate 2 and enhancing the contrast of the displayed picture. Such a black matrix 11 is formed of a mixture of an oxide of, for example, iron, nickel, copper or manganese and a low-melting glass, or metal chromium or graphite.

A diffusion-preventing layer 12 of silica or silicon nitride may be formed between the surface of the back plate 3 and the electron emissive elements 7 to prevent impurities from being diffused into the electron emissive elements 7.

(Spacers 5)

The spacers 5 of the invention used for the above-mentioned picture display device 1 are formed by firing integrally with the face plate 2 or the back plate 3, and are adhered and secured at the other ends thereof to the back plate 3 or to the face plate 2 with an adhesive such as frit glass. In FIG. 1, the spacers 5 are disposed on both sides of a set of phosphor layer which includes three phosphor layers 6R, 6G and 6B. The spacers, however, may be disposed for every phosphor layer 6, or may be disposed after every plural sets of phosphor layers.

It is desired that the spacers 5 have a height of from 500 to 4000 $\mu$m and, particularly, from 1500 to 4000 $\mu$m from the standpoint of suppressing short-circuiting electric discharge between the electron emissive elements 7 and the phosphor layer 6 and desirably controlling the density of electron rays arriving at the phosphor layer 6. It is further desired that the spacers 5 have a thickness of from 70 to 200 $\mu$m from the standpoint of strength, decreasing the size thereof and increasing the brightness of display. It is further desired that the gap among the plural spacers 5 is such that the face plate 2 and the back plate 3 are effectively prevented from being deformed by the external pressure when the space between the face plate 2 and the back plate 3 is maintained vacuum, and is, for example, not smaller than 400 $\mu$m but is not larger than 5 mm and, particularly, not larger than 1 mm.

Further, the spacers 5 may have the shape of a rib, a lattice, a pole or a frame. When, for example, the rib-like spacers 5 are to be arranged in many number, it is desired that the spacers are arranged in parallel maintaining the above-mentioned gap. The spacers 5 of the invention having the above-mentioned size are formed of a sintered product of a structure in which at least one metal selected from the group consisting of Si, Zn, Al, Sn, Cu and Mg is dispersed in a glass. That is, the spacers 5 containing the metal exhibit electrically conducting property and are effectively prevented from being electrically charged. The invention therefore effectively solves various problems caused by the electric charge in the spacers, e.g., prevents distortion in the picture caused by the bending electron beams and prevents a drop in the brightness caused by abnormal discharge between the electron emissive elements 7 and the spacers 5.

Further, the above metal has a property of being oxidized accompanied by a volume expansion when it is heated at a temperature of from 350 to 490° C. in an oxygen-containing atmosphere. For example, metal Si starts oxidizing at about 450° C. in the open air. In the present invention, the oxidation-start temperature stands for a minimum temperature at which both heat is absorbed accompanying the softening of the glass and heat is generated accompanying the oxidation of the metal on a TG-DTA curve, and the weight increases.

Therefore, upon firing a mixture of the glass powder and the metal powder under the above-mentioned conditions, the volume of the glass powder shrinks due to firing but the metal is partly oxidized and expands. The expansion of volume helps relax the shrinkage due to firing. That is, the spacers 5 of the invention can be produced while relaxing its tendency of being shrunk by firing, making it possible to effectively solve various problems caused by the shrinkage due to firing at the time when the spacers 5 are formed integrally with the face plate 2 or the back plate 3, e.g., effectively preventing the deformation of the spacers 5 and peeling of the spacers 5 off the face plate 2 or the back plate 3, and further making it possible to improve the positional precision of the spacers 5. Thus, the spacers 5 of the present invention can be produced while relaxing the shrinkage due to firing, and are prevented from being deformed or peeled even when they have a height (not smaller than 500 $\mu$m) and a thickness (not larger than 200 $\mu$m) as described above, and can be precisely arranged maintaining a fine gap.

In the spacers 5 of the present invention, the glass component may be a lead glass (PbO—$B_2O_3$—$SiO_2$), an alkali silicate glass, a bismuth glass ($Bi_2O_3$—$B_2O_3$), a $SiO_2$—$B_2O_3$ glass a soda glass or a silica glass. From the standpoint of mechanical strength, sintering at a low temperature, wettability to the metal component, adhesiveness to the face plate 2 or the back plate 3 and chemical stability, however, it is desired to use a lead lass containing PbO, $SiO_2$ and $B_2O_3$ or a bismuth glass containing $Bi_2O_3$ and $B_2O_3$. It is desired that the glass as a softening temperature usually over a range of from 370 to 850° C. From the standpoint of producing the spacers 5 at a low temperature, however, it is most desired that the glass has a softening temperature of from 370 to 430° C. Desirably, the glass is generally contained in the sintered product in an amount of from 40 to 75% by weight.

The above-mentioned metal components, i.e., Si, Zn, Al, Sn, Cu and Mg may be dispersed in a single kind in the sintered product or may be dispersed in two or more kinds in combination in the sintered product. Among these metal components, it is desired to use Si, Zn and Sn from the standpoint of imparting electrically conducting property, oxidation-start temperature and expansion of volume due to the oxidation of a metal. From the standpoint of compatibility to the glass and adhesiveness, further, it is most desired to use metal Si. Among the above-mentioned metal components, the oxides of Sn, Zn and Cu have relatively high electrically conducting property, and are desired from the standpoint of imparting electrically conducting property to the spacers 5.

It is further desired that the above-mentioned metal component is contained in the sintered product in such an amount that the volume resistivity of the sintered product (spacer 5) is from $1 \times 10^8$ to $1 \times 10^{14}$ Ω–cm at 25° C. When the volume resistivity is not smaller than the above range, it is not allowed to effectively prevent the spacers 5 from being electrically charged. When the volume resistivity is smaller than the above range, on the other hand, it becomes difficult to obtain a densely sintered product, and the spacers 5 formed of such a sintered product are not satisfactory from the standpoint of strength. The content of the metal in the sintered product having such a volume resistivity is usually from 1.5 to 34% by weight though it may vary depending upon the kind of the metal.

The sintered product constituting the spacers 5 of the present invention may further contain a ceramic filler such as $TiO_2$, ZnO, $SnO_2$, $ZrO_2$, $SiO_2$, BN or $Al_2O_3$ in addition to the above-mentioned glass component and metal component. The ceramic filler works to lower the firing temperature, control the coefficient of thermal expansion of the sintered product, and to impart a color, and further works to adjust the distorting point of the glass so that the spacer 5 will not be deformed during the firing. It is, for example, desired to so adjust the spacers 5 by using the ceramic filler that they exhibit an average coefficient of thermal expansion at 15 to 450° C. of from 7 to 9 ppm/° C. and, particularly, from 7.5 to 8.2 ppm/° C. The face plate 2 or the back plate 3 provided with the spacers 5 having such an average coefficient of thermal expansion offers such an advantage that the spacers 5 do not develop such defect as cracking even when they are heated or cooled. The ceramic filler is used in an amount that will not impair the electrically conducting property imparted by the metal or will not impair the effect for relaxing the shrinkage due to firing produced by the oxidation of the metal. It is desired that the content of the ceramic filler in the sintered product is not larger than 30% by weight and, particularly, not larger than 20% by weight.

Among the above-mentioned ceramic fillers, $TiO_2$ has a property of lowering the firing temperature and the oxidation-start temperature of the above-mentioned particular metal. By using rutile-type $TiO_2$ or anatase-type $TiO_2$, in particular, the firing temperature can be lowered by not less than 10° C., particularly, by not less than 20° C. and, more particularly, by not less than 30° C. The rutile-type $TiO_2$ exhibits a property of more lowering the firing temperature than that of the anatase-type $TiO_2$ and exhibits a strong catalytic action for promoting the oxidation of a particular metal, but also exhibits a property of reducing the glass. When the glass is reduced, components such as lead, etc. in the glass flow out, whereby the density of the sintered product decreases, which is disadvantageous from the standpoint of forming spacers having a large strength. In the present invention, therefore, it is desired to use the anatase-type $TiO_2$.

When the glass containing PbO and $Bi_2O_3$ is used, in particular, it is advantageous to use ZnO or $SnO_2$ as the ceramic filler from the standpoint of obtaining a highly strong spacer. That is, when the mixture containing the above-mentioned glass and particular metal is fired, PbO and $Bi_2O_3$ in the glass precipitate on the glass surfaces and are reduced accompanying the oxidation of the particular metal, permitting Pb and Bi to be evaporated and sublimated. As Pb and Bi evaporate and sublimate, many voids occur in the sintered product and, hence, the sintered product (spacer) loses the strength. When ZnO or $SnO_2$ is used as a filler, however, PbO and $Bi_2O_3$ are effectively suppressed from being precipitated on the glass surfaces. As a result, occurrence of voids is suppressed, which is advantageous from the standpoint of obtaining highly strong spacers.

The spacers 5 of the present invention formed of the above-mentioned sintered product are most suitably used for the picture display device 1 (FED) of the structure shown in FIG. 1. However, the spacers 5 of the present invention can be further preferably used for the picture display devices other than FED, such as plasma display panel (PDP) and plasma address liquid crystal panel (PALC) having a structure of which the interior is evacuated or is filled with a gas of a predetermined pressure.

The ceramic for forming the spacers 5 suppresses the shrinkage caused by firing, and can be desirably used as n insulating plate for the wiring board equipped with a fine wiring layer, as a ferrule for connecting the optical fibers or optical parts, and as a sealing member.

(Method of Producing the Spacers 5)

The spacers 5 of the invention are produced by preparing a molding paste containing a glass, the above-mentioned metal component and, as required, a ceramic filler, applying the paste onto a predetermined plate that forms the face plate 2 or the back plate 3, forming a molded article of spacers, and firing the molded article under predetermined conditions. Starting Powders:

It is desired that the above-mentioned glass component in the sintered product for forming the spacers 5 is in the form of a powder having an average particle diameter of not larger than 6 μm from the standpoint of obtaining a densely sintered product.

It is desired that the above-mentioned metal for imparting electrically conducting property to the spacers 5 and for preventing the shrinking during the firing, is in the form of a powder or a fiber having any shape such as spherical shape, irregular shape, hollow shape or flakes. It is further desired that the powder has an average particle size of from 0.5 to 6 μm and, particularly, from 1.0 to 3.0 μm from the standpoint of not oxidizing part of the metal by firing-that will be described later, but leaving the metal to increase the surface areas of the metal to promote the expansion of volume by the oxidation of part of the metal. As described earlier, the metal component is used in such an amount that the volume resistivity (25° C.) of the sintered product lies within a predetermined range. In general, however, the metal component is used in an amount of from 5 to 70 parts by weight and, particularly, from 20 to 60 parts by weight per 100 parts by weight of the glass powder. When the amount of the metal is smaller than the above range, the effect for imparting electrically conducting property is not enough for preventing the electric charging, and the expansion of volume by oxidation is not enough for relaxing the shrinkage caused by firing. When the amount of the metal exceeds the above range, it becomes difficult not only to obtain a paste in which the metal is homogeneously dispersed but also to obtain a densely sintered product, and the strength of the spacers 5 may decrease.

It is desired that the ceramic filler used for adjusting the coefficient of thermal expansion has an average particle diameter of from 0.05 to 10 $\mu$m, preferably, from 0.1 to 3 $\mu$m and, most preferably, from 0.5 to 2 $\mu$m. As described above, the ceramic filler is used in an amount of not larger than 30% by weight and, particularly, not larger than 20% by weight in the sintered product.

When $TiO_2$ is used as the ceramic filler, it is desired that its amount in the sintered product lies within the above-mentioned range, and is from 5 to 50 parts by weight per 100 parts by weight of the glass powder, and is from 16 to 600 parts by weight per 100 parts by weight of the above-mentioned particular metal. Use of the $TiO_2$ makes it possible to lower the firing temperature and the oxidation-start temperature of the particular metal, offering such an advantage that the phosphor layer 6 on the face plate 2 and the electron emissive elements 7 on the back plate 3 can be formed simultaneously with the spacers 5 by co-firing.

When ZnO or $SnO_2$ is used as the ceramic filler, it is desired that its amount in the sintered product lies within the above-mentioned range, and is from 5 to 50 parts by weight per 100 parts by weight and, particularly, from 10 to 30 parts by weight per 100 parts by weight of the glass powder, and is from 10 to 150 parts by weight and, particularly, from 20 to 100 parts by weight per 100 parts by weight of the sum of PbO and $Bi_2O_3$ in the glass.

(a) Preparation of the Molding Paste:

In the present invention, the molding paste is prepared by using the above-mentioned starting powder. That is, the above-mentioned glass powder, a powder of a particular metal and, as required, a ceramic filler are mixed together, and to which are added a binder such as acrylic resin, a plasticizer, a dispersant and an organic solvent, followed by kneading to prepare a molding paste in which the starting powders are homogeneously dispersed.

(b) Preparation of the Molded Article for Spacers:

In the present invention, a molded article for spacers is formed on an insulating plate that serves as the face plate 2 or the back plate 3 by using the molding paste prepared above.

Such molding can be carried out by print-applying the molding paste for molding onto the insulating plate plural times by using a mask such as predetermined pattern, or by arranging a mold on the insulating plate, filling the mold with the molding paste and removing the mold. In order to further improve the dimensional precision of the spacers 5 according to the present invention, a soft resin layer is formed on the insulating plate that serves as the face plate 2 or the back plate 3, recessed portions for forming spacers are engraved in the soft resin layer, the recessed portions for forming spacers are filled with the molding paste and, then, the soft resin layer is removed to form the molded article for spacers. The steps will now be described with reference to FIG. 2.

Figure 2A:
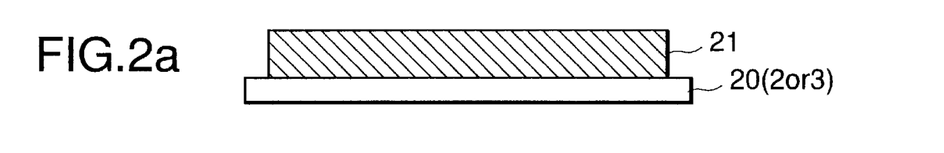
FIGS. 2a to 2f are views illustrating the steps of producing a molded article of spacers.

(b-1) Step for Molding a Soft Resin (FIG. 2a):

First, an insulating plate 20 is prepared, and a soft resin layer 21 of a thickness corresponding to the height of the spacers 5 is formed on the insulating plate 20.

The insulting plate 20 serves as the face plate 2 or the back plate 3 shown in FIG. 1, and is made of a glass or a ceramic.

Recessed portions are easily formed in the soft resin layer 21 by press-molding that will be described later, the soft resin layer 21 being formed of a resin composition which maintains the recessed portions of a desired shape. The soft resin layer 21 is formed by applying a resin paste onto the insulating plate 20, the resin paste being obtained by mixing a resin component such as acrylic or butyral thermoplastic resin, an ultraviolet ray-curing resin, an electron ray-curing resin, a thermosetting resin or a wax with a plasticizer such as DBP (dibutyl phthalate), DOP (dioctyl phthalate) or α-terpineol, or a high-boiling solvent such as benzyl alcohol or IPA (isopropyl alcohol), so as to have a suitable softness.

In order to maintain the shape of the soft resin layer 21, a resin powder of a plastic cured in the form of beads may be added to the resin paste. The soft resin layer 21 is finally removed. Therefore, it is desired that the resin powder is completely decomposed and evaporated through the heat treatment at, for example, not higher than 600° C. Further, the resin paste can be easily applied by any known film-forming method, such as screen-printing method, doctor blade method, slit coater method, spin coater method, etc.

To improve the adhesiveness between the soft resin layer 21 and the insulating plate 20, an adhesive layer (not shown) may be formed maintaining a thickness of from about 1 to about 20 $\mu$m on the surface of the insulating plate 21. In this case, the resin component contained in the above-mentioned molding paste is blended in the adhesive layer to enhance the adhesiveness between the spacer 5 and the insulating plate 20 (face plate 2 or back late 3).

It is further allowable to apply the above-mentioned resin paste onto a polyester film such as of polyethylene terephthalate to form a soft resin layer having a predetermined thickness, press-adhere the film onto the surface of the insulating plate 20 while heating it, and peel the film off, so that the soft resin layer 21 is transferred onto the surface of the insulating plate 20.

Figure 2B:
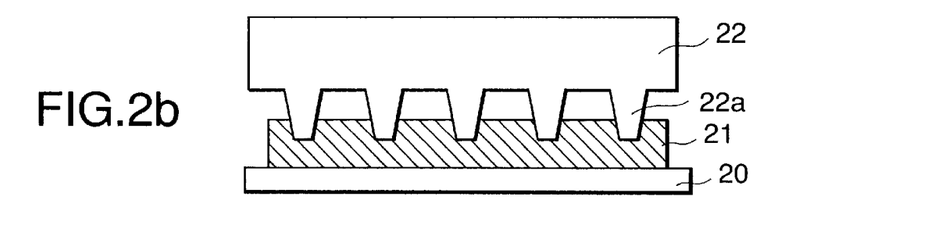
Figure 2C:
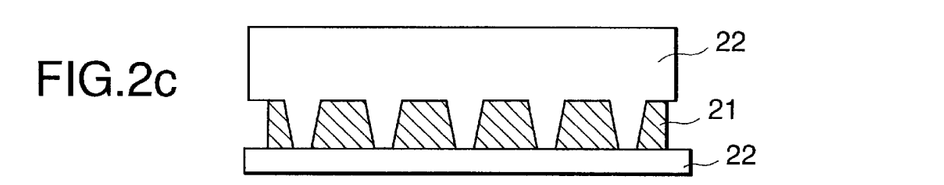
Figure 2D:
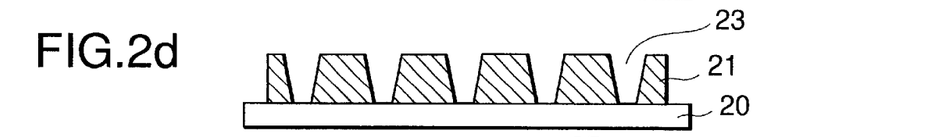

(b-2) Step of Forming Recessed Portions for Molding Spacers (FIGS. 2b to 2d):

Recessed portions 23 for molding spacers are formed in the thus formed soft resin layer 21 by using a mold 22.

The mold 22 has protrusions 22a corresponding to the shape of spacers. The mold 22 is pushed onto the soft resin layer 21 and is then pulled to form recessed portions 23. It is desired that the mold 22 is made of a material having a high rigidity, such as metal, ceramics, glass or hardened resin, and is in the form of a flat plate or a roll.

When the mold 22 is a flat plate, the mold 22 is arranged at a predetermined position on the surface of the soft resin layer 21, pushed with a predetermined pressure, and is pulled, to form recessed portions 23. When the mold 22 is a roll, the mold 22 is disposed at a predetermined position on the surface of the soft resin layer 21, rotated and moved while being pushed thereon, to form recessed portions 23.

As described above, the recessed portions 23 for molding spacers are formed in the soft resin layer 21 which is, then cured, as required, to stabilize the shape of the recessed portions 23.

When the recessed portions 23 for molding spacers are formed as described above, it is desired that the recessed portions 23 have such a sectional shape that the width of the bottom is small and the width increases toward the upper portion as shown in FIG. 2d. That is, upon forming the recessed portions 23 in such a sectional shape, the metal mold 22 (protrusions 22a) can be easily pulled, and the spacers 5 have an increased strength as will be described later.

Figure 2E:
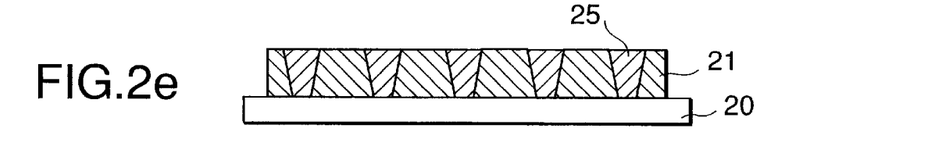

(b-3) Step of Molding an Article (FIG. 2e):

Referring next to FIG. 2e, the recessed portions 23 for forming spacers are filled with the above-mentioned molding paste (designated at 25 in FIG. 2e) for forming the spacers, thereby to mold the paste into the shape of spacers.

The recessed portions 23 are filled with the molding paste by a known printing method such as screen-printing, packaging using a dispenser, vacuum injection, rubbing by squeezing, etc. In this case, the packaged molding paste is cured, as required, to stabilize the shape.

Figure 2F:
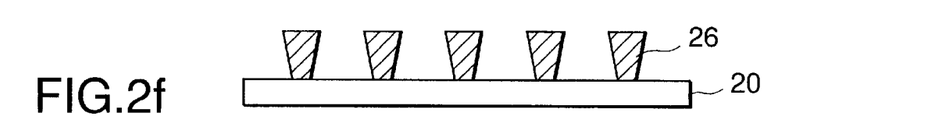

(b-4) Step of Removing the Soft Resin Layer (FIG. 2f):

In the present invention, the soft resin layer 21 is removed from the insulating plate 20 in a state where the recessed portions 23 are filled with the molding paste 25, thereby to obtain, as shown in FIG. 2f, a molded article of spacers (molded spacer articles) 26 on the insulating plate 20 that serves as the face plate 2 or the back plate 3.

The soft resin layer 21 is removed by, for example, (i) physically peeling the resin layer 21 off the surface of the insulating plate 20 by the brush-washing method or the like method;

(ii) dissolving and flowing out the resin layer 21 using a chemical such as solvent; or (iii) burning and evaporating the resin layer 21 through the heat treatment.

The thus molded spacer articles 26 have a shape corresponding to the recessed portions 23, i.e., have a spacer shape corresponding to the protrusions 22a formed on the mold 22, the width increasing toward the upper ends from the root portions thereof.

(c) Firing Step:

According to the present invention, the spacer articles 26 molded on the insulating plate 20 as described above are fired to obtain the spacers 5 firmly joined to the face plate 2 or to the back plate 3 integrally therewith.

In the present invention, the firing must be conducted in an oxygen-containing atmosphere such as open air. Upon conducting the firing in such an atmosphere, a metal (Si, Zn, Al, Sn, Cu or Mg) contained in the molded spacer articles is partly oxidized to undergo the volume expansion relaxing the shrinking caused by the sintering of glass in the molded articles, preventing the spacers 5 from being deformed by the shrinkage due to firing and effectively preventing the spacers 5 from being peeled off the insulating plate 20 (face plate 2 or the back plate 3). Further, since the shrinking due to firing is effectively relaxed, a size difference is small between the molded spacer articles 26 and the spacers 5, i.e., a change in the size is as very small as 2% or less, particularly, 1% or less, more particularly, 0.5% or less and, further particularly, 0.3% or less.

It is desired to conduct the firing at a temperature of from 420 to 480° C. Upon conducting the firing at such a temperature, it is allowed to obtain spacers 5 of a densely sintered product having a relative density of not smaller than 65%, preferably, not smaller than 70% and, most preferably, not smaller than 75%. When the firing temperature is lower than the above range, the above-mentioned metal is not effectively oxidized and it becomes difficult to effectively relax the shrinkage caused by firing.

The spacers 5 of the invention are formed on the insulating plate that serves as the face plate 2 or the back plate 3 integrally therewith, and exhibit a very high junction strength to the insulating plate. Due to the presence of the above-mentioned metal, further, the spacers 5 exhibit a highly electrically conducting property and a volume resistivity lying within the above-mentioned range, and are effectively prevented from being electrically charged.

Figure 3A:
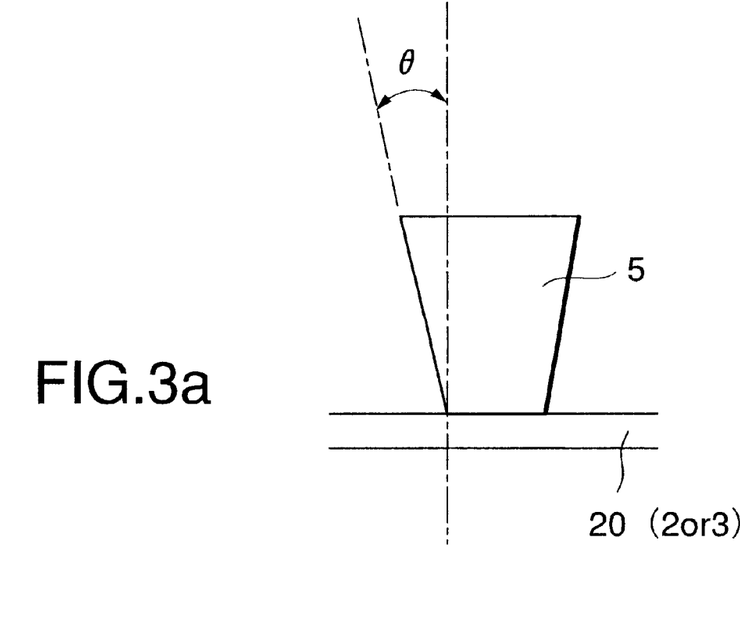
FIGS. 3a and 3b are views illustrating the spacer of the present invention in cross section and on an enlarged scale.
Figure 3B:
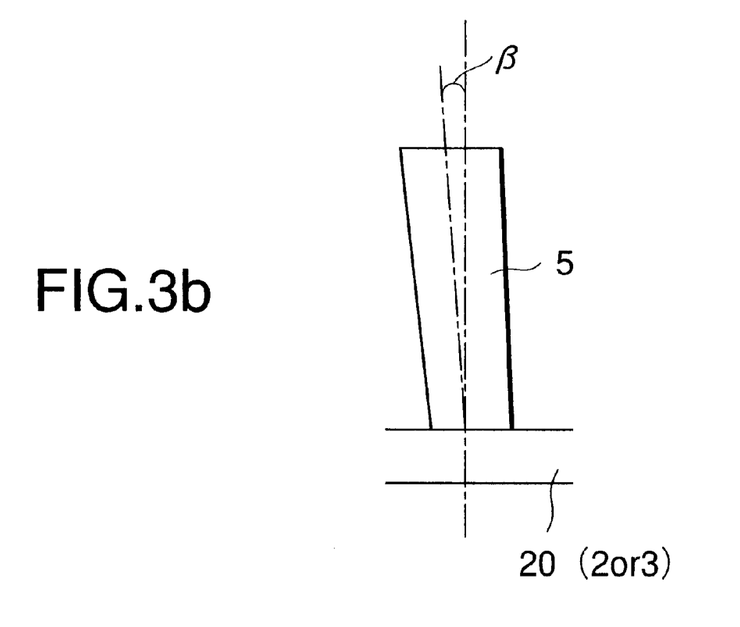
Figures 4A, 4B:
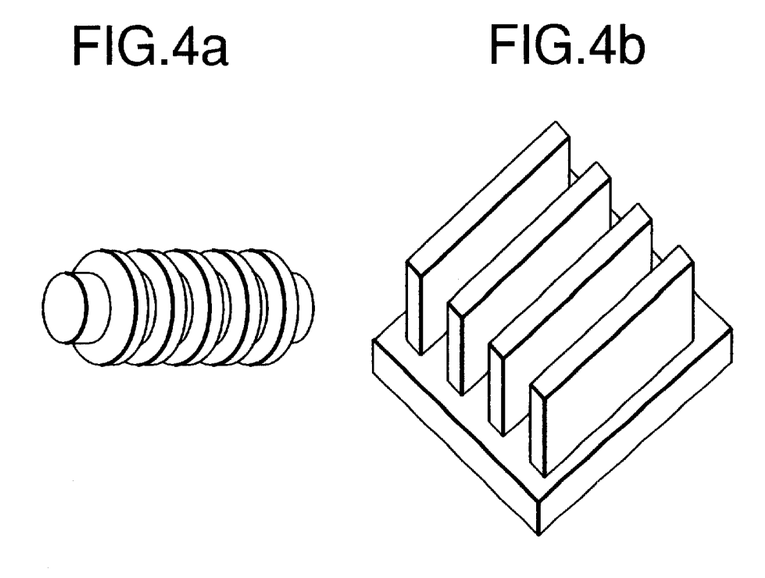
FIGS. 4a to 4h are views illustrating spacers of various shapes produced according to the method of the present invention.
Figure 4C:
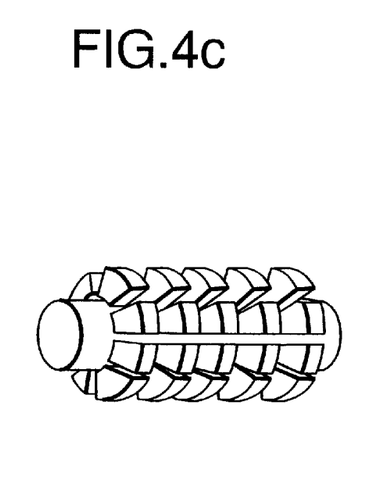
Figure 4D:
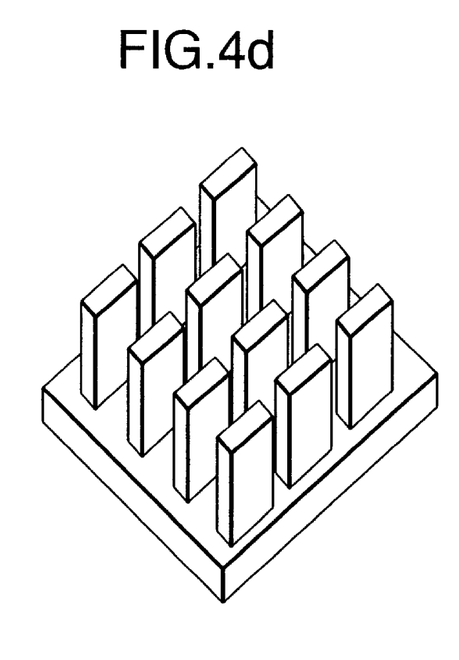
Figure 4E:
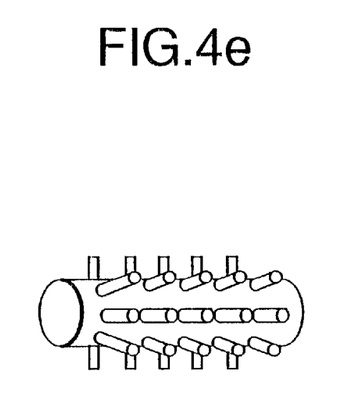
Figure 4F:
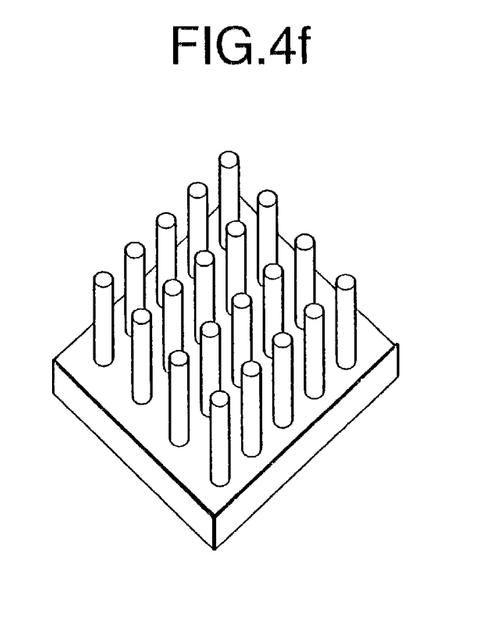
Figure 4G:
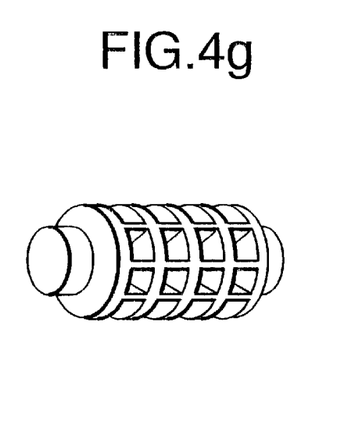
Figure 4H:
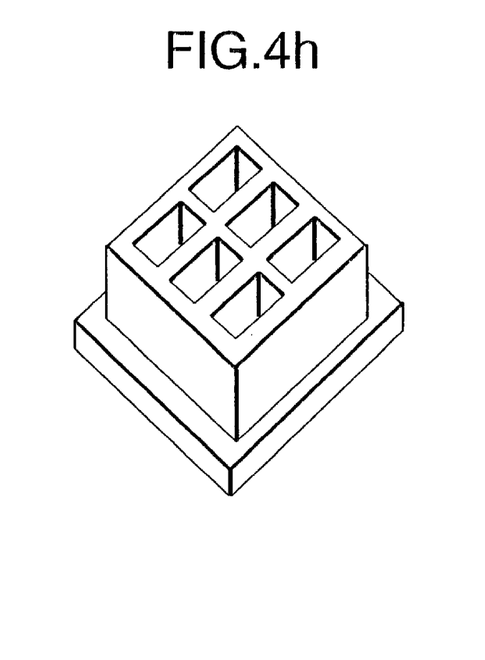

It is desired that the spacers 5 of the present invention obtained as described above have a sectional shape as shown in FIG. 3a. That is, the spacers 5 have the sectional shape substantially the same as the molded spacer articles 26 shown in FIG. 2f, i.e., have a trapezoidal shape in cross section, the width thereof increasing toward the ends thereof from the root portions thereof (side of the insulating plate 20). As will be obvious from Example 6 appearing later, the spacers 5 having the trapezoidal shape exhibit a very large strength against the load from the upper side. In this spacer 5, further, it is desired that an angle $\theta$ (hereinafter often called side surface angle) subtended by the side surface thereof and a perpendicular drawn to the surface of the insulating plate 20 on which the spacer 5 is integrally molded, lies over a range of from 0.5 to 8°. In the invention, further, when the spacers 5 are formed being slightly tilted relative to the surface of the insulating plate 20 (face plate 2 or back plate 3) that hold the spacers, the trajectory of electrons emitted from the electron emissive element neighboring the spacer 5 is not hindered provided the angle (hereinafter often called inclination angle) $\beta$ subtended by a straight line connecting the center of root of the spacer 5 to the center of upper end thereof and a perpendicular drawn to the surface of the insulating plate 20 is in a range of not larger than 5° as shown in FIG. 3b. That is, the spacer having a trapezoidal shape in cross section as shown in FIG. 3a maintains a large strength even when it is inclined as shown in FIG. 3b.

The arrangement and shape of the thus formed spacers 5 are not limited to those of the rib shape, but may be arranged in various shapes such as lattices, poles and frames as shown in FIGS. 4a to 4h.

(Production of the Picture Display Device)

According to the present invention as described above, the spacers 5 are formed on the surface of the face plate 2 or the back plate 3 integrally therewith. The ends of the spacers 5 are adhered and secured in position on the back plate 3 or the face plate 2 with an adhesive such as frit glass to produce the picture display device of a structure shown in, for example, FIG. 1. The glass frit may be the one comprising the above-mentioned glass powder and a particular metal.

The face plate 2 is obtained by preparing a transparent plate using the above-mentioned glass or the like, cutting it into a predetermined shape, forming an ITO film 10 and a black matrix 11 on one surface thereof, and forming a phosphor layer 6 on the portion surrounded by the black matrix 11.

In this case, the ITO film 10 can be formed by a known printing method such as screen-printing method, gravure-printing method or offset printing method, by a paste-application method such as roll coater method, or by a deposition method. The black matrix 11 can be formed by a known printing method such as photolithography method, screen-printing method, gravure-printing method or offset printing method. The phosphor layer 6 can be formed by applying a phosphor paste by a printing method such as photolithography method, screen-printing method, gravure-printing method or offset printing method, or by an ink-jet method and, then, removing by evaporation the organic component in the phosphor paste by the heat treatment at 400 to 600° C. and, particularly, at 450 to 500° C. When the ITO film 10 is not to be formed, a metal back is formed, as required, on the surface of the phosphor layer 6 by vaporization.

According to the present invention, the spacers 5 can be formed on the face plate 2 integrally therewith in any stage.

For example, the spacers 5 can be formed on the surface of the face plate 2 in a stage prior to forming the ITO film 10. Or, the spacers 5 can be formed on the surface of the face plate 5 after the black matrix 11 and the phosphor layer 6 are formed. Further, the spacers 5 and the phosphor layer 6 can be simultaneously formed by applying the phosphor paste onto predetermined positions after having formed the above-mentioned molded spacer articles 26, and firing the molded spacer articles 26 simultaneously with the heat treatment for removing the resin component from the phosphor paste.

On the other hand, the back plate 3 is obtained by preparing a plate of the above-mentioned material, cutting the plate into a predetermined shape, forming a diffusion-preventing layer 12 on one surface of the plate and, then, forming electron emissive elements 7 comprising predetermined electrode layers 7a, 7b and insulating layers 7c. The diffusion-preventing layer 12 can be formed by sputtering method, CVD method, ion beam method, vaporization method or MBE method, the electrode layers 7a, 7b can be formed by photolithography method, and the insulating layers 7c can be easily formed by a known thin film-forming method such as sputtering method, vaporization method, ion-beam method, CVD method and MBE method. When the spacers 5 are to be formed on the back plate 3 integrally therewith, it is desired that the spacers 5 are formed integrally therewith after the formation of the diffusion-preventing layer 12 and the electron ray-emitting elements 7.

A frame 4 for sealing the interior of the device is stuck with an adhesive such as frit glass onto the outer circumferential portion of either the thus formed face plate 2 or the back plate 3 (spacers 5 are integrally formed on either one of them). Thereafter, the face plate 2 and the back plate 3 are so positioned that the electron emissive elements 7 and the phosphor layer 6 face each other. Then, the ends of the spacers 5 and the upper end of the frame 4 are adhered and secured onto the face plate 2 or the back plate 3 with the frit glass or the like. Next, a gas discharge port 9 that has been formed in an end of the back plate 3 is connected to an external exhaust pipe, and the device is heated at 400 to 500° C. while evacuating the interior of the device to a pressure of about $10^{-4}$ Pa to cure the adhesive. Finally, the gas discharge port 9 is sealed to produce the picture display device 1 having a structure shown in, for example, FIG. 1.

EXAMPLES

Experiment 1

TiO$_2$ was added as a ceramic filler in an amount of 30 parts by weight to 100 parts by weight of a low-melting glass of the type of PbO—B$_2$O$_3$—SiO$_2$ having a distorting point of 410° C. Then, metal powders shown in Table 1 were added at ratios shown in Table 1 per 100 parts by weight of the above glass powder, and the mixtures were wet-mixed together by using a ball mill of zirconia balls in an IPA (isopropyl alcohol) for 18 hours.

To 100 parts by weight of the thus obtained mixture powder were added a binder, a polymerization initiator and a dispersant in a total amount of 42 parts by weight. The resulting mixture was kneaded in a carbitol solvent to prepare a paste. A silicone rubber mold was filled with the paste and, after defoamed to a sufficient degree, was brought into contact with the surface of an insulating plate of a borosilicate glass to accomplish the vacuum sealing, followed by heat treatment at 110° C. for 30 minutes. Then, the silicone rubber mold was removed to form a molded article of spacers.

The obtained molded spacer articles were measured for their thickness and height by using a laser displacement meter (LC-2440/2400 manufactured by Keyence Co.) to make sure that they possessed the same size as the silicone rubber mold within a measuring precision.

The silicone rubber mold possessed a depth of recessed portions (height of spacers) of 1200 μm, a width of recessed portions (thickness of spacers) of 200 μm, and a distance between the recessed portions (distance between the spacers) of 800 μm.

Further, the molded article was fired in an oxygen atmosphere (flowing oxygen at a flow rate of about 2 liters/min.) at 460° C. for 15 minutes. Then, the spacers were measured for their height using the same laser displacement meter as the one described above, and a ratio of the height of the spacers to the height of the molded article of spacers [(height of spacers/height of molded article of spacers)×100%] was calculated as a dimensional change.

Another flat plate was placed on the ends of the spacers of the thus obtained plate with spacers, a force was exerted in the direction of height of the spacers to compress the two plates to measure the load F with which the spacers were broken. The pressure P (F/S) for the total sectional area S of the spacers was calculated as the strength of the spacers.

The appearance of the spacers was observed through a stereo microscope to judge the presence of peeling, warping, bending and cut. The spacers without them were regarded to be favorable as shown in Table 1.

The spacers were partly pulverized and were measured by the X-ray diffraction to confirm the presence of the metal that was added. The presence of oxide of the metal was confirmed in all samples except the sample No. 1. Further, portions of the spacers were measured for their volume resistivities (described as resistance in Table) by using an insulation tester.

TABLE 1

| Sample No. | Metal Kind | Metal Amount (parts by wt.) | Spacer Thickness (μm) | Spacer Height (μm) | Change in size (%) | Spacer strength (kg/cm$^2$) | Appearance of spacer | Presence of metal | Resistance (Ω · cm) |
|---|---|---|---|---|---|---|---|---|---|
| *1 | — | — | 172 | 1022 | 85.2 | — | warped, peeled | no | $\geq 1.0 \times 10^{14}$ |
| 2 | Si | 2 | 176 | 1051 | 87.6 | 10.2 | good | yes | $9.0 \times 10^{13}$ |
| 3 | Si | 5 | 185 | 1108 | 92.3 | 27.8 | good | yes | $7.2 \times 10^{13}$ |
| 4 | Si | 10 | 188 | 1129 | 94.1 | 27.3 | good | yes | $3.4 \times 10^{13}$ |
| 5 | Si | 20 | 194 | 1162 | 96.8 | 25.2 | good | yes | $1.1 \times 10^{13}$ |
| 6 | Si | 30 | 196 | 1177 | 98.1 | 23 | good | yes | $1.2 \times 10^{11}$ |

TABLE 1-continued

| Sample No. | Metal Kind | Metal Amount (parts by wt.) | Spacer Thickness (μm) | Spacer Height (μm) | Change in size (%) | Spacer strength ($kg/cm^2$) | Appearance of spacer | Presence of metal | Resistance (Ω · cm) |
|---|---|---|---|---|---|---|---|---|---|
| 7 | Si | 45 | 197 | 1181 | 98.4 | 20.2 | good | yes | $2.8 \times 10^{10}$ |
| 8 | Si | 50 | 198 | 1189 | 99.1 | 18.7 | good | yes | $1.7 \times 10^{10}$ |
| 9 | Si | 60 | 198 | 1190 | 99.1 | 17.6 | good | yes | $3.4 \times 10^{9}$ |
| 10 | Si | 70 | 199 | 1193 | 99.4 | 16.8 | good | yes | $4.8 \times 10^{9}$ |
| 11 | Zn | 30 | 194 | 1162 | 96.8 | 24.6 | good | yes | $2.1 \times 10^{10}$ |
| 12 | Al | 30 | 192 | 1151 | 95.9 | 25.3 | good | yes | $1.8 \times 10^{10}$ |
| 13 | Cu | 30 | 198 | 1190 | 99.2 | 20.1 | good | yes | $6.2 \times 10^{9}$ |
| 14 | Mg | 30 | 196 | 1175 | 97.9 | 23.8 | good | yes | $3.8 \times 10^{10}$ |
| 15 | Sn | 30 | 192 | 1154 | 96.2 | 24.6 | good | yes | $1.9 \times 10^{10}$ |
| 16 | Si | 2 | 179 | 1070 | 89.2 | 16.5 | good | yes | $4.9 \times 10^{13}$ |
| | Zn | 2 | | | | | | | |
| 17 | Si | 18 | 195 | 1168 | 97.3 | 26.3 | good | yes | $7.8 \times 10^{10}$ |
| | Zn | 13 | | | | | | | |
| 18 | Si | 20 | 198 | 1183 | 98.6 | 17.8 | good | yes | $2.4 \times 10^{10}$ |
| | Zn | 32 | | | | | | | |
| 19 | Si | 14 | 191 | 1147 | 95.6 | 22.7 | good | yes | $1.3 \times 10^{10}$ |
| | Al | 8 | | | | | | | |
| | Cu | 4 | | | | | | | |
| 20 | Si | 17 | 199 | 1189 | 99.1 | 16.9 | good | yes | $6.2 \times 10^{9}$ |
| | Al | 16 | | | | | | | |
| | Cu | 20 | | | | | | | |

Sample marked with * lies outside the scope of the invention.

From Table 1 above, the sample No. 1 to which the predetermined metal powder was not added shrunk to a large extent upon the firing and peeled off the insulating plate.

On the other hand, samples Nos. 2 to 20 prepared according to the present invention shrunk little upon the firing of the spacers and were not peeled off the insulating plate.

Figure 5:
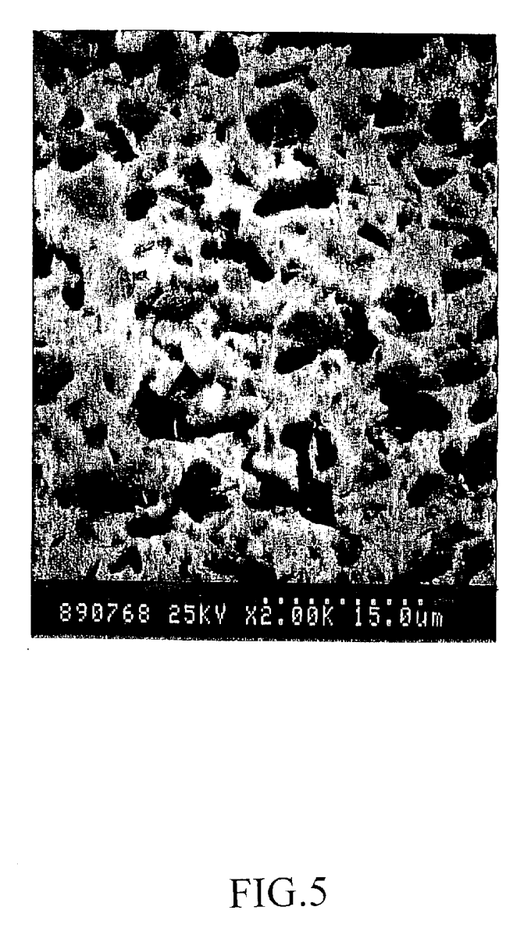
FIG. 5 is a scanning-type electron microphotograph showing the cross section of a sintered product of a sample No. 6 of Example 1.

The sample No. 6 was observed for its cross section using a scanning-type electron microscope (SEM) as shown in FIG. 5. Through EPMA elemental analysis, it was confirmed that Si particles (black portions) had been dispersed.

Figure 6:
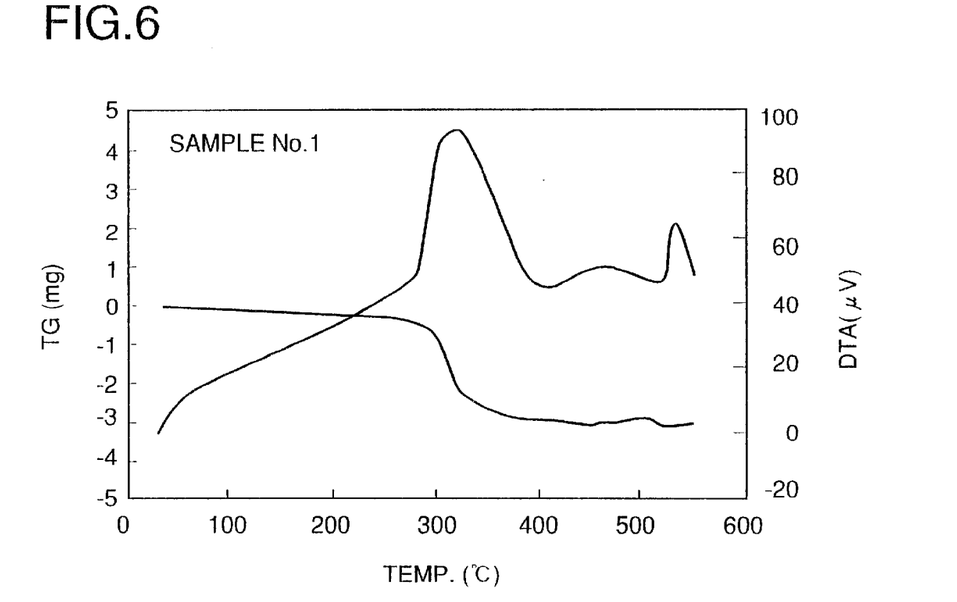
FIG. 6 is a diagram showing TG and DTA curves of a sample No. 1 of Example 1.
Figure 7:
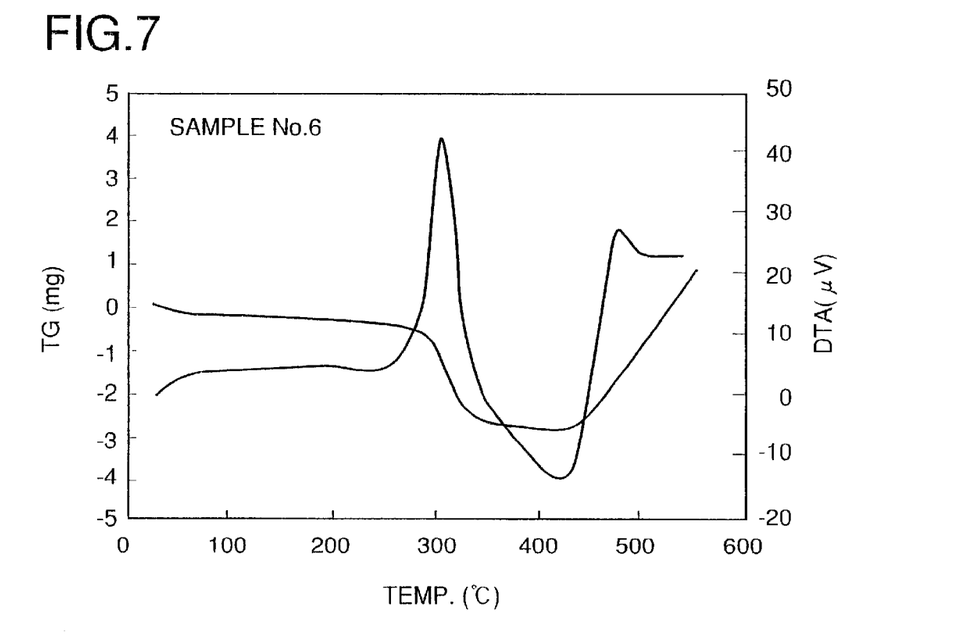
FIG. 7 is a diagram showing TG and DTA curves of a sample No. 6 of Example 1.

Further, the samples Nos. 1 and 6 were subjected to the thermogravimetric analysis (TG) and to the differential thermal analysis (DTA) in the open atmosphere to obtain results as shown in FIGS. 6 and 7. The sample No. 6 to which the metal Si was added exhibited an increase in the weight at not lower than 450° C., presumably due to the oxidation of metal Si.

Experiment 2

The spacers were formed in the same manner as in Experiment 1 but changing the shape as shown in Table 2, and were evaluated for their shrinking factor upon firing and appearance. The results were as shown in Table 2. Samples Nos. 21 to 27 were fired in the open air.

Experiment 3

The spacers were formed in the same manner as in Experiment 1 but adding metal powders having average particle diameters as shown in Table 3 and conducting the firing in the atmospheres shown in Table 3 to measure the change in the size and strength. Further, the spacer densities were measured by the helium gas substitution method to calculate relative densities which are ratios for the theoretical densities. The results were as shown in Table 3.

TABLE 2

| Sample No. | Amount of Si (parts by wt.) | Molded article Thickness (μm) | Molded article Height (μm) | Firing atmosphere | Spacer Thickness (μm) | Spacer Height (μm) | Change in size (%) | Spacer strength ($kg/cm^2$) | Appearance of spacer | Presence of metal | Resistance (Ω · cm) |
|---|---|---|---|---|---|---|---|---|---|---|---|
| 21 | 30 | 200 | 1000 | open air | 190 | 954 | 95.4 | 26 | good | yes | $1.4 \times 10^{11}$ |
| 22 | 30 | 150 | 1000 | open air | 141 | 942 | 94.2 | 24 | good | yes | $2.5 \times 10^{11}$ |
| 23 | 30 | 100 | 1000 | open air | 94 | 938 | 93.2 | 18 | good | yes | $2.1 \times 10^{11}$ |
| 24 | 30 | 200 | 500 | open air | 192 | 481 | 96.2 | 34 | good | yes | $1.8 \times 10^{11}$ |
| 25 | 30 | 200 | 1200 | open air | 189 | 1132 | 94.3 | 23 | good | yes | $1.2 \times 10^{11}$ |
| 26 | 30 | 200 | 1500 | open air | 188 | 1412 | 94.1 | 22 | good | yes | $1.3 \times 10^{11}$ |
| *27 | — | 200 | 1200 | open air | 160 | 961 | 80.1 | 45 | peeled | no | $\geqq 1.0 \times 10^{14}$ |
| 28 | 30 | 200 | 1200 | oxygen | 196 | 1177 | 98.1 | 28 | good | yes | $1.3 \times 10^{11}$ |

Sample marked with * lie outside the scope of the invention.

TABLE 3

| Sample No. | Amount of Si (parts by wt.) | Average particle diameter (μm) | Firing atmosphere | Spacer Thickness (μm) | Spacer Height (μm) | Change in size (%) | Density (%) | Spacer strength (kg/cm²) | Appearance of spacer | Presence of metal | Resistance (Ω · cm) |
|---|---|---|---|---|---|---|---|---|---|---|---|
| 29 | 30 | 0.3 | open air | 191 | 1141 | 95.1 | 84.3 | 20.5 | good | yes | 9.8 × 10¹⁰ |
| 30 | 30 | 0.5 | open air | 192 | 1145 | 95.4 | 84.4 | 21.1 | good | yes | 1.1 × 10¹¹ |
| 31 | 30 | 1 | open air | 194 | 1162 | 96.8 | 85.6 | 23.9 | good | yes | 1.4 × 10¹¹ |
| 32 | 30 | 3 | open air | 193 | 1160 | 96.7 | 83.7 | 22.7 | good | yes | 1.2 × 10¹¹ |
| 33 | 30 | 6 | open air | 187 | 1123 | 93.6 | 80.1 | 20.6 | good | yes | 1.0 × 10¹¹ |
| 34 | 30 | 7 | open air | 181 | 1084 | 90.3 | 75.6 | 19.8 | good | yes | 9.7 × 10¹⁰ |
| 35 | 30 | 1 | oxygen | 197 | 1181 | 98.4 | 87.6 | 24.6 | good | yes | 1.1 × 10¹² |
| 36 | 30 | 3 | oxygen | 196 | 1179 | 98.1 | 86.5 | 23 | good | yes | 1.3 × 10¹² |
| 37 | 30 | 6 | oxygen | 191 | 1142 | 95.2 | 82.8 | 22.2 | good | yes | 1.6 × 10¹² |
| 38 | 30 | 7 | oxygen | 185 | 1103 | 91.9 | 78.6 | 20.1 | good | yes | 1.8 × 10¹² |

$9.8 \times 10^{10}$, etc.

Sample marked with * lie outside the scope of the invention.

From the results of Tables 2 and 3, the sample No. 27 to which the metal Si was not added peeled off the insulating plate. On the other hand, samples Nos. 21 to 26 and 28 to 38 containing the metal Si in the sintered product according to the present invention made it possible to form spacers that were not deformed and that did not peel off, and further made it possible to impart electrically conducting property to the spacers.

Further, the samples Nos. 35 to 38 which were fired in oxygen exhibited further decreased change in the size. The change in the size could be further decreased with a decrease in the average particle diameter of the metal powder that was added.

Experiment 4

The following two kinds of glasses A and B were prepared.

Glass A: $PbO$—$SiO_2$—$B_2O_3$ (softening point of 410° C.)

Glass B: $Bi_2O_3$—$B_2O_3$ (softening point of 420° C.) To 100 parts by weight of each of the above two kinds of glasses were added metals shown in Tables 4 and 5, and ZnO or $SnO_2$ having an average particle diameter of 2 μm at ratios as show in Tables 4 and 5, and the mixtures were wet-mixed in an IPA (isopropyl alcohol) using a ball mill of zirconia balls.

By using the mixture powders, the molded articles of spacers were formed in quite the same manner as in Experiment 1, and the molded articles were fired to prepare plates with spacers (the shapes of spacers and the firing conditions were the same as those of Experiment 1).

The thus obtained plates with spacers were evaluated in the same manner as in Experiment 1. The results were as shown in Tables 4 and 5.

TABLE 4

| Sample No. | Starting material (parts by wt.) | | | | Particle diameter (μm) |
|---|---|---|---|---|---|
| | Glass | Metal | Amount | ZnO | |
| *1 | A | — | — | 20 | 1 |
| 2 | A | Si | 5 | 20 | 1 |
| 3 | A | Si | 10 | 20 | 1 |
| 4 | A | Si | 30 | 20 | 1 |
| 5 | A | Si | 40 | 20 | 1 |
| 6 | A | Si | 50 | 20 | 1 |
| 7 | A | Si | 70 | 20 | 1 |

TABLE 4-continued

| Sample No. | Glass | Metal | Amount | ZnO | Particle diameter (μm) |
|---|---|---|---|---|---|
| 8 | A | Si | 30 | 15 | 1 |
| 9 | A | Si | 30 | 30 | 1 |
| 10 | A | Si | 30 | 50 | 1 |
| 11 | A | Sn | 30 | 20 | 0.5 |
| 12 | A | Sn | 30 | 20 | 2 |
| 13 | A | Si Cu | 40 10 | 20 | 1 |
| 14 | B | Si | 30 | 20 | 1 |
| 15 | B | Sn | 30 | 20 | 1 |

| Sample No. | Appearance | Spacer Thickness (μm) | Height (μm) | Shrinking fuctor (%) | Relative density (μm) | Strength (MPa) |
|---|---|---|---|---|---|---|
| *1 | warp, peel | 172 | 1022 | 85.2 | 98.4 | — |
| 2 | good | 186 | 1118 | 93.2 | 88.3 | 3.13 |
| 3 | good | 190 | 1142 | 95.2 | 82.9 | 3.01 |
| 4 | good | 198 | 1189 | 99.1 | 75.3 | 2.83 |
| 5 | good | 198 | 1190 | 99.2 | 70.2 | 2.19 |
| 6 | good | 199 | 1193 | 99.4 | 66.6 | 1.96 |
| 7 | good | 199 | 1195 | 99.6 | 65.3 | 1.81 |
| 8 | good | 198 | 1186 | 98.8 | 75.3 | 2.95 |
| 9 | good | 198 | 1190 | 99.2 | 76.8 | 3.64 |
| 10 | good | 199 | 1194 | 99.5 | 75.3 | 4.16 |
| 11 | good | 194 | 1165 | 97.1 | 70.1 | 3.09 |
| 12 | good | 194 | 1166 | 97.2 | 71.6 | 2.91 |
| 13 | good | 199 | 1198 | 99.8 | 68.3 | 2.53 |
| 14 | good | 196 | 1178 | 98.2 | 74.3 | 3.08 |
| 15 | good | 192 | 1154 | 96.2 | 73.9 | 3.12 |

| Sample No. | Ceramic component note 1) | Resistance (Ω · cm) |
|---|---|---|
| *1 | G, ZnO | >$1.0 \times 10^{14}$ |
| 2 | G, Si, $SiO_2$, ZnO | $5.8 \times 10^{13}$ |
| 3 | G, Si, $SiO_2$, ZnO | $3.1 \times 10^{13}$ |
| 4 | G, Si, $SiO_2$, ZnO | $1.2 \times 10^{11}$ |
| 5 | G, Si, $SiO_2$, ZnO | $4.5 \times 10^{10}$ |
| 6 | G, Si, $SiO_2$, ZnO | $1.2 \times 10^{10}$ |
| 7 | G, Si, $SiO_2$, ZnO | $4.5 \times 10^{8}$ |
| 8 | G, Si, $SiO_2$, ZnO | $7.1 \times 10^{10}$ |
| 9 | G, Si, $SiO_2$, ZnO | $6.3 \times 10^{10}$ |
| 10 | G, Si, $SiO_2$, ZnO | $4.9 \times 10^{10}$ |
| 11 | G, Sn, $SnO_2$, ZnO | $5.3 \times 10^{10}$ |
| 12 | G, Sn, $SnO_2$, ZnO | $4.8 \times 10^{10}$ |
| 13 | G, Si, $SiO_2$, Cu, CuO, ZnO | $1.3 \times 10^{10}$ |
| 14 | G, Si, $SiO_2$, ZnO | $6.1 \times 10^{10}$ |
| 15 | G, Sn, $SnO_2$, ZnO | $7.4 \times 10^{10}$ |

Sample marked with * lie outside the scope of the invention.
Note 1): G; glass, Si; metal Si, Sn: metal Sn, Cu: metal Cu

TABLE 5

| Sample No. | Starting material (parts by wt.) | | | | |
|---|---|---|---|---|---|
| | Glass | Metal | Amount | ZnO | Particle diameter ($\mu$m) |
| *16 | A | — | — | 30 | 1 |
| 17 | A | Si | 5 | 30 | 1 |
| 18 | A | Si | 10 | 30 | 1 |
| 19 | A | Si | 30 | 30 | 1 |
| 20 | A | Si | 40 | 30 | 1 |
| 21 | A | Si | 50 | 30 | 1 |
| 22 | A | Si | 70 | 30 | 1 |
| 23 | A | Si | 30 | 10 | 1 |
| 24 | A | Si | 30 | 20 | 1 |
| 25 | A | Si | 30 | 40 | 1 |
| 26 | A | Si | 30 | 50 | 1 |
| 27 | A | Si | 30 | 30 | 0.5 |
| 28 | A | Si | 30 | 30 | 2 |
| 29 | A | Sn | 30 | 30 | 1 |
| 30 | A | Si | 20 | 30 | 1 |
| 31 | A | Zn | 32 | | |
| | | Si | 40 | 30 | 1 |
| | | Cu | 10 | | |
| 32 | B | Si | 30 | 30 | 1 |
| 33 | B | Sn | 30 | 30 | 1 |

| Sample No. | Spacer | | | | | |
|---|---|---|---|---|---|---|
| | Appearance | Thickness ($\mu$m) | Height ($\mu$m) | Shrinking fuctor (%) | Relative density ($\mu$m) | Strength (MPa) |
| *16 | warp, peel | 172 | 1022 | 85.2 | 98.4 | — |
| 17 | good | 186 | 1117 | 93.1 | 90.4 | 3.65 |
| 18 | good | 190 | 1142 | 95.2 | 82.3 | 3.61 |
| 19 | good | 197 | 1183 | 98.6 | 75.5 | 3.63 |
| 20 | good | 198 | 1189 | 99.1 | 70.4 | 2.72 |
| 21 | good | 198 | 1193 | 99.4 | 67.4 | 2.52 |
| 22 | good | 199 | 1195 | 99.6 | 65.8 | 2.34 |
| 23 | good | 194 | 1168 | 97.3 | 71.9 | 2.60 |
| 24 | good | 198 | 1190 | 99.2 | 74.2 | 3.39 |
| 25 | good | 199 | 1194 | 99.5 | 77.8 | 3.89 |
| 26 | good | 199 | 1196 | 99.7 | 78.1 | 4.41 |
| 27 | good | 198 | 1189 | 99.1 | 77.9 | 3.48 |
| 28 | good | 196 | 1178 | 98.2 | 73.2 | 4.50 |
| 29 | good | 194 | 1165 | 97.1 | 76.5 | 3.31 |
| 30 | good | 199 | 1196 | 99.7 | 69.3 | 2.42 |
| 31 | good | 199 | 1198 | 99.8 | 68.9 | 3.12 |
| 32 | good | 197 | 1184 | 98.7 | 74.3 | 3.32 |
| 33 | good | 194 | 1166 | 97.2 | 76.8 | 3.41 |

| Sample No. | Ceramic component note 1) | Resistance ($\Omega \cdot$ cm) |
|---|---|---|
| *16 | G, SnO$_2$ | >1.0 × 10$^{14}$ |
| 17 | G, Si, SiO$_2$, SnO$_2$ | 5.6 × 10$^{13}$ |
| 18 | G, Si, SiO$_2$, SnO$_2$ | 3.1 × 10$^{13}$ |
| 19 | G, Si, SiO$_2$, SnO$_2$ | 2.0 × 10$^{11}$ |
| 20 | G, Si, SiO$_2$, SnO$_2$ | 1.1 × 10$^{11}$ |
| 21 | G, Si, SiO$_2$, SnO$_2$ | 3.2 × 10$^{10}$ |
| 22 | G, Si, SiO$_2$, SnO$_2$ | 7.6 × 10$^{8}$ |
| 23 | G, Si, SiO$_2$, SnO$_2$ | 4.1 × 10$^{11}$ |
| 24 | G, Si, SiO$_2$, SnO$_2$ | 7.2 × 10$^{11}$ |
| 25 | G, Si, SiO$_2$, SnO$_2$ | 8.2 × 10$^{11}$ |
| 26 | G, Si, SiO$_2$, SnO$_2$ | 8.9 × 10$^{11}$ |
| 27 | G, Si, SiO$_2$, SnO$_2$ | 9.5 × 10$^{10}$ |
| 28 | G, Si, SiO$_2$, SnO$_2$ | 6.9 × 10$^{10}$ |
| 29 | G, Sn, SnO$_2$ | 1.9 × 10$^{10}$ |
| 30 | G, Si, SiO$_2$, Zn, ZnO, SnO$_2$ | 3.3 × 10$^{10}$ |
| 31 | G, Si, SiO$_2$, Cu, CuO, SnO$_2$ | 2.7 × 10$^{10}$ |
| 32 | G, Si, SiO$_2$, SnO$_2$ | 7.2 × 10$^{10}$ |
| 33 | G, Sn, SnO$_2$ | 4.2 × 10$^{9}$ |

Sample marked with * lie outside the scope of the invention.
Note 1): G; glass, Si; metal Si, Sn: metal Sn, Cu: metal Cu From Tables 4 and 5, the samples Nos. 1 and 16 to which the predetermined metal was not added shrunk to a large extent upon the firing and peeled off the insulating late.

On the other hand, samples Nos. 2 to 15, and 17 to 33, to which the predetermined metal and ZnO or SnO$_2$ were added according to the invention shrunk little upon the firing, and were not peeled off the insulating plate. Besides, the spacer strength could be increased to be not smaller than 1 MPa, particularly, not smaller than 1.5 MPa and, more particularly, not smaller than 2 MPa.

Experiment 5

A flat plate mold was prepared by forming 84 spacer protuberances maintaining a pitch of 600 $\mu$m on the surface of a flat metal plate measuring 50×50×5 mm, the protuberances having a width of 200 $\mu$m, a length of 50 mm and a height of 1000 $\mu$m. On the other hand, a silica layer was formed on the surface of the glass plate of a soda lime glass having a thickness of 2 mm and measuring 200×200 mm.

Further, a plasticizer was added into a paraffin wax to prepare a resin paste. The resin paste was applied onto the silica layer of the glass plate using a slit coater to form a soft resin layer (1000 $\mu$m in thickness).

The flat plate was pushed onto the soft resin layer on the glass plate to form recessed portions for forming spacers corresponding to the protuberances of the flat plate mold.

The recessed portions for molding the spacers were filled with a paste for molding obtained by kneading a low-melting glass powder having an average particle diameter of 5 $\mu$m, an alumina powder, a metal silicon powder, a binder, a solvent and a dispersant, followed by drying to solidify the paste. Thereafter, the glass plate was heated at 90° C. to flow out the resin layer.

Then, the glass plate from which the resin layer was removed was heated in an open air to remove the binder, followed by firing at a temperature of 500° C. for 10 minutes to prepare spacers formed on the surface of the glass plate integrally therewith.

The shape of the spacers formed on the plate was measured by using a laser displacement meter, and it was learned that the spacers had been formed having a height which is accurate to 1000±20 $\mu$m. A flat plate measuring 50×50 mm was placed on the plate with spacers, a force was exerted to compress the two plates in the direction of height of spacers to measure the load F at which the spacers were broken, and the pressure P (F/S) for the total area S of the spacers was calculated as a spacer strength. As a result, the spacer strength was 20 kg/cm$^2$ from which it was confirmed that the atmospheric pressure of 1 kg/cm$^2$ exerted on the spacers can be sufficiently coped with when the interior of the FED display panel is evacuated.

Further, a measurement of the resistance of the spacers indicated that the resistance of the spacers in which metal silicon is remaining has dropped by more than 1, enabling the surfaces of the spacers to be less likely to be electrically charged.

Experiment 6

An ITO film was formed by vaporization on the surface of a glass plate of a soda lime having a thickness of 2 mm and measuring 40×40 mm to prepare a plate for face plate.

Then, by using the resin paste prepared in Experiment 5, a resin layer was formed maintaining a thickness of 1050 $\mu$m on the ITO film on the surface of the plate for forming the face plate. The plate was cut into a size of 25×25 mm.

Then a metal mold of a square shape of a size of 10 mm having spacer protuberances (height of 1200 $\mu$m, pitch of 700 $\mu$m) was pushed onto the resin layer of the plate to form recessed portions for molding spacers in the resin layer.

Then, the recessed portions for molding the spacers were filled with the resin paste followed by drying to solidify the paste. Then, the plate was heated at 90° C. to dissolve the resin layer, thereby to form a molded article of spacers on the plate.

The thus obtained plate with molded article of spacers was heated to remove the binder, followed by firing at 500° C. for 10 minutes to prepare a face plate on which the spacers were molded as a unitary structure.

Thus, there were obtained the face plates having spacers molded as a unitary structure, the spacers having a pitch of 700 μm, a height of 1200 μm, a width of 80 μm at the root portions, and having a width at the upper ends, a side surface angle θ and an inclination angle β varying as shown in Table 6 (the side face angle θ and the inclination angle β were measured by using a three-dimensional measuring instrument).

Figure 8:
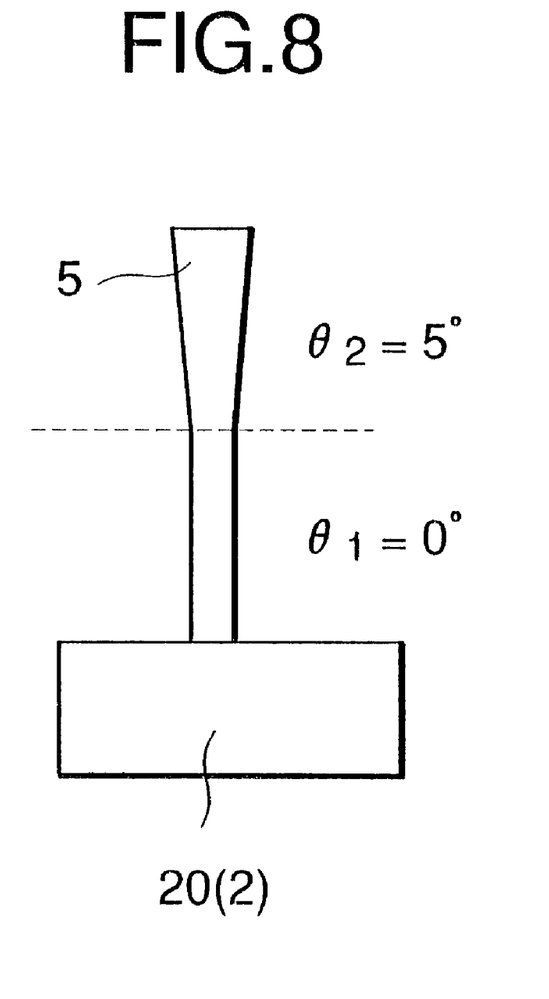
FIG. 8 is a diagram showing the sectional shape of a spacer formed of a sample No. 7 of Example 6.

In Table 6, the spacer of sample No. 7 has, as shown in FIG. 8, a side surface angle θ of 0° on one-half side surface on the side of the root and has a side surface angle θ of 5° on one-half side surface on the side of the upper end.

The above face plate was allowed to possess a central spacer only but other spacers were all removed, and a load was exerted on the spacer from the upper side, and the load (spacer strength) at which the spacer was broken was measured. The results were as shown in Table 6.

TABLE 6

| Sample No. | Width of upper end portion (μm) | Side surface angle θ (°) | Spacer strength (kg) | | |
|---|---|---|---|---|---|
| | | | β = 0° | β = 6° | β = 8° |
| 1 | 80 | 0 | 1.2 | 0.26 | <0.1 |
| 2 | 100 | 0.5 | 1.3 | 0.65 | 0.15 |
| 3 | 160 | 2 | 1.1 | 0.82 | 0.31 |
| 4 | 240 | 4 | 1.5 | 1 | 0.65 |
| 5 | 420 | 8 | 1.3 | 0.95 | 0.8 |
| 6 | 500 | 10 | 1.4 | 1.3 | 1.2 |
| 7 | 180 | 0/5 | 1.2 | 0.56 | <0.1 |

(The width of spacers is 80 μm at thr root)

From the results of table 6, it was confirmed that the samples nos. 2 to 7 which were so formed that the width of upper ends of the spacers were broader than the width of root portions thereof could be stably supported by the face plate without much losing the strength even in case the spacers were formed in an inclined manner.

What is claimed is:

1. A spacer disposed between a face plate which displays a picture and a back plate that faces a back surface of the face plate to maintain space for electric discharge therebetween, wherein said spacer is formed of a sintered product having a structure in which at least one metal selected from the group consisting of Si, Zn, Al, Sn, Cu and Mg is dispersed in a glass.

2. A spacer according to claim 1, wherein said glass contains PbO, $SiO_2$ and $B_2O_3$.

3. A spacer according to claim 1, wherein said glass contains $Bi_2O_3$ and $B_2O_3$.

4. A spacer according to claim 1, wherein said sintered product further contains a filler.

5. A spacer according to claim 4, wherein said filler is $TiO_2$.

6. A spacer according to claim 4, wherein said filler is ZnO or $SnO_2$.

7. A spacer according to claim 1, wherein said spacer has a volume resistivity of from $1\times10^8$ to $1\times10^{14}$ Ω–cm (25° C.).

8. A spacer according to claim 1, wherein said spacer has a thickness of not larger than 200 μm and a height of not smaller than 500 μm.

9. A spacer according to claim 1, wherein said spacer is formed on the back surface of said face plate or on the surface of said back plate on the side of the face plate integrally therewith.

10. A spacer disposed between a face plate which displays a picture and a back plate that faces a back surface of the face plate to maintain space for electric discharge therebetween, wherein said spacer is formed of a sintered product having a structure in which at least one metal selected from the group consisting of Si, Zn, Al, Sn, Cu and Mg is dispersed in a glass,
wherein said spacer has an average coefficient of linear thermal expansion (15 to 450° C.) of from 7 to 9 ppm/° C.

11. A spacer disposed between a face plate which displays a picture and a back plate that faces a back surface of the face plate to maintain space for electric discharge therebetween, wherein said spacer is formed of a sintered product having a structure in which at least one metal selected from the group consisting of Si, Zn, Al, Sn, Cu and Mg is dispersed in a glass,
wherein said spacer is formed on the back surface of said face plate or on the surface of said back plate on the side of the face plate integrally therewith, and
wherein the width of said spacer at the ends thereof is broader than the width at the root portions thereof.

12. A spacer disposed between a face plate which displays a picture and a back plate that faces a back surface of the face plate to maintain space for electric discharge therebetween, wherein said spacer is formed of a sintered product having a structure in which at least one metal selected from the group consisting of Si, Zn, Al, Sn, Cu and Mg is dispersed in a glass,
wherein said spacer is formed on the back surface of said face plate or on the surface of said back plate on the side of the face plate integrally therewith, and
wherein an angle subtended by the side surfaces of the spacer and a perpendicular drawn to the back surface of the face plate on where said spacer is mounted or drawn onto the surface of the back plate on the side of the face plate, is from 0.5 to 8° C.

13. A picture display device comprising a face plate for displaying a picture having a phosphor layer formed on the back surface thereof, a back plate facing a back surface of the face plate and having electron emissive elements on the surface thereof on the side of the face plate, and spacers provided between the face plate and the back plate to maintain space for electric discharge therebetween, wherein said spacers are formed of a sintered product having a structure in which at least one metal selected from the group consisting of Si, Zn, Al, Sn, Cu and Mg is dispersed in a glass.

14. A picture display device according to claim 13, wherein said spacers are formed in a plural number maintaining a suitable gap.

15. A picture display device comprising a face plate for displaying a picture having a phosphor layer formed on the back surface thereof, a back plate facing a back surface of the face plate and having electron emissive elements on the surface thereof on the side of the face plate, and spacers provided between the face plate and the back plate to maintain space for electric discharge therebetween, wherein said spacers are formed of a sintered product having a structure in which at least one metal selected from the group consisting of Si, Zn, Al, Sn, Cu and Mg is dispersed in a glass, and
wherein said spacers are formed on the back surface of said face plate integrally therewith, and the width of said spacers at the ends thereof are wider than the width of said spacers at the root portions thereof.

* * * * *